Sept. 7, 1965     A. W. ENGEL ETAL     3,204,444
APPARATUS FOR REPAIRING METAL KEGS
Filed Oct. 28, 1960     2 Sheets-Sheet 1

INVENTOR
Albert W. Engel
Gerald J. Forbes
BY Robert M. Dunning
ATTORNEY

Sept. 7, 1965  A. W. ENGEL ETAL  3,204,444
APPARATUS FOR REPAIRING METAL KEGS
Filed Oct. 28, 1960  2 Sheets-Sheet 2
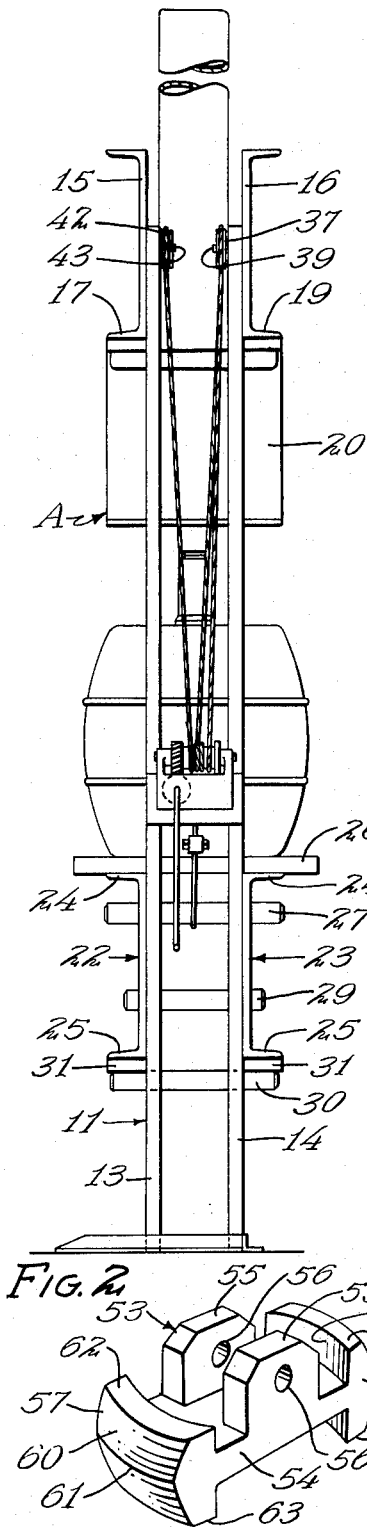
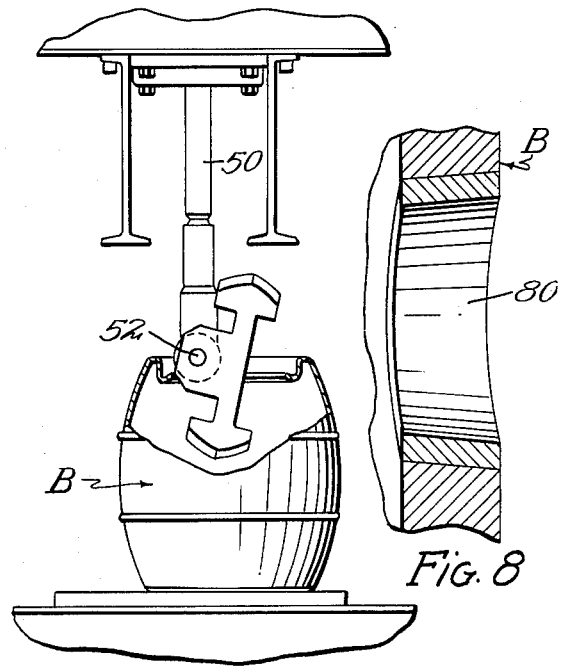
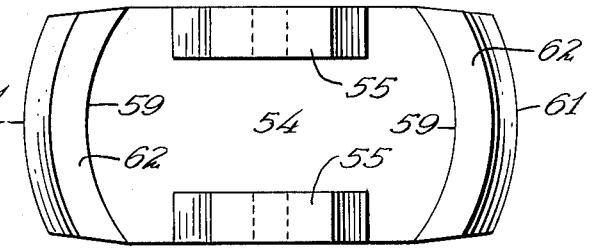
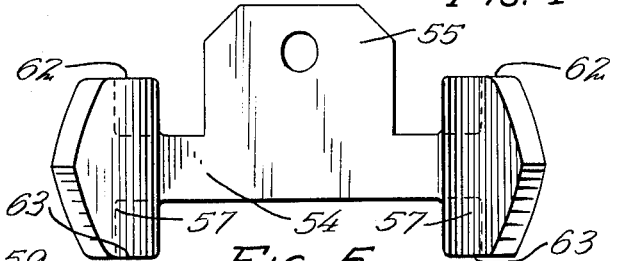
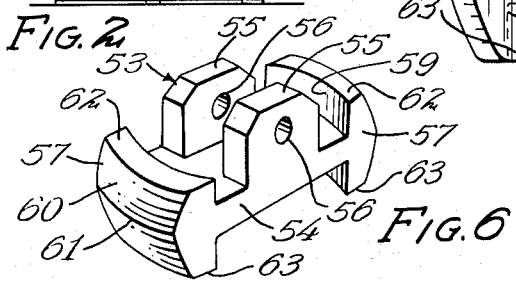
INVENTOR
Albert W. Engel
Gerald J. Forbes
BY Robert M. Dunning
ATTORNEY

3,204,444
APPARATUS FOR REPAIRING METAL KEGS
Albert W. Engel, 2018 Portland Ave., and Gerald J. Forbes, 1065 Edgewater Blvd., both of St. Paul, Minn.
Filed Oct. 28, 1960, Ser. No. 65,618
5 Claims. (Cl. 72—404)

This invention relates to a method and apparatus for repairing metal kegs and deals particularly with a method and apparatus for reshaping the ends of the kegs to remove dents and to return the kegs to their original shape.

During recent years the use of metal kegs for containing beer, ale and similar products has largely replaced the use of wooden kegs and barrels for similar products. One of the biggest difficulties which has been experienced in the use of kegs of this type lies in the fact that they often become dented and deformed during handling. The kegs are usually delivered to their destination by trucks, and the weight of the kegs and their contents makes them very difficult to handle. In many instances, the filled kegs are often dropped from the tailgates of a truck onto a cushioning pad, and the kegs are then rolled to their destination. If the kegs are not accurately dropped onto the cushioning pads, the kegs often strike the ground or pavement and the ends of the kegs are dented inwardly by the impact. If the kegs become damaged to any material extent, they must be either repaired or replaced, as the inward denting of the keg ends changes the volume of the product which may be contained. As a result, a very material replacement cost is involved, as it has been extremely difficult to repair the kegs without disassembling them which, in itself is a costly and time consuming operation and one which impairs the strength of the keg.

It is an object of the present invention to provide a simple apparatus for repairing the kegs and for returning them to their original shape in an extremely short period of time. In actual practice, the keg may be completely repaired in a time of somewhat less than fifteen minutes. As a result, the keg may be completely reshaped and returned to the useful condition for a small fraction of the cost which has been previously been considered necessary for this work.

A feature of the present invention resides in the provision of a hydraulic press, and a die which is designed to extend into the interior of the keg after an opening has been cut in one end thereof. This die is preferably pivotally attached to the end of a plunger and includes arcuate end portions which are shaped similarly to the ends of the keg, the arcuate portions being of sufficient length to engage about 60° of the end wall of the keg, the two ends of the die thus engaging about, or slightly more than, one-third of the inner periphery of the keg end. This die is swung into position with the lower end of the keg, and the plunger is forced downwardly so as to press the dents or indentations from about one-third of the periphery of the keg end. The die is then raised slightly, and either the die or the barrel is rotated so that by again moving the plunger downwardly, a second third of the keg end is reshaped. The same procedure is followed to reshape the final one-third of the lower end of the keg.

Abutments are provided above the upper end of the keg against which the upper end of the keg may be forced to reshape this upper keg end. As the upper and lower surfaces of the die are of identical shape to the lower edge thereof, the upper end of the keg may be straightened by reversing the action of the plunger, about one-third of the periphery of the end being straightened during each upward movement of the plunger. The keg is then lowered upon the support, and the die is tilted and removed from the opening in the upper end of the keg. The disc which has been cut from the top of the keg is then replaced and welded into position to complete the repair.

A feature of the present invention resides in the novel method of repairing the keg which comprises cutting a disc from the end of the keg which is of smaller diameter than the rim of the keg which is to be reshaped, inserting a die through the opening, the die being of greater radius than the keg opening, and forcing the die into the keg ends to remove the inward indentations in the rims in the end of the keg. By rotating the keg relative to the die, the entire end of the keg may be reshaped in about three operations of the die.

A further feature of the present invention resides in the fact that the method and apparatus may be used in conjunction with a female die to correct any outwardly bulged portions at the ends of the keg. In actual practice, however, the use of such a die is normally unnecessary, as the dents in the kegs are normally in an inward direction, and as the internal die will, in most instances, return the keg to its normal shape.

These and other objects and novel features of the invention will be more clearly and fully set forth in the following specification and claims.

In the drawings forming a part of the specification:

FIGURE 2 is an end elevational view of the structure illustrated in FIGURE 1.

FIGURE 3 is a diagrammatic view through a portion of the apparatus, indicating the manner in which the die is inserted into the keg.

FIGURE 4 is a top plan view of the keg straightening die.

FIGURE 5 is a side elevational view of the keg straightening die.

FIGURE 6 is a perspective view of the keg straightening die.

FIGURE 8 is an enlarged sectional view through a repaired bunghole.

Figure 1:
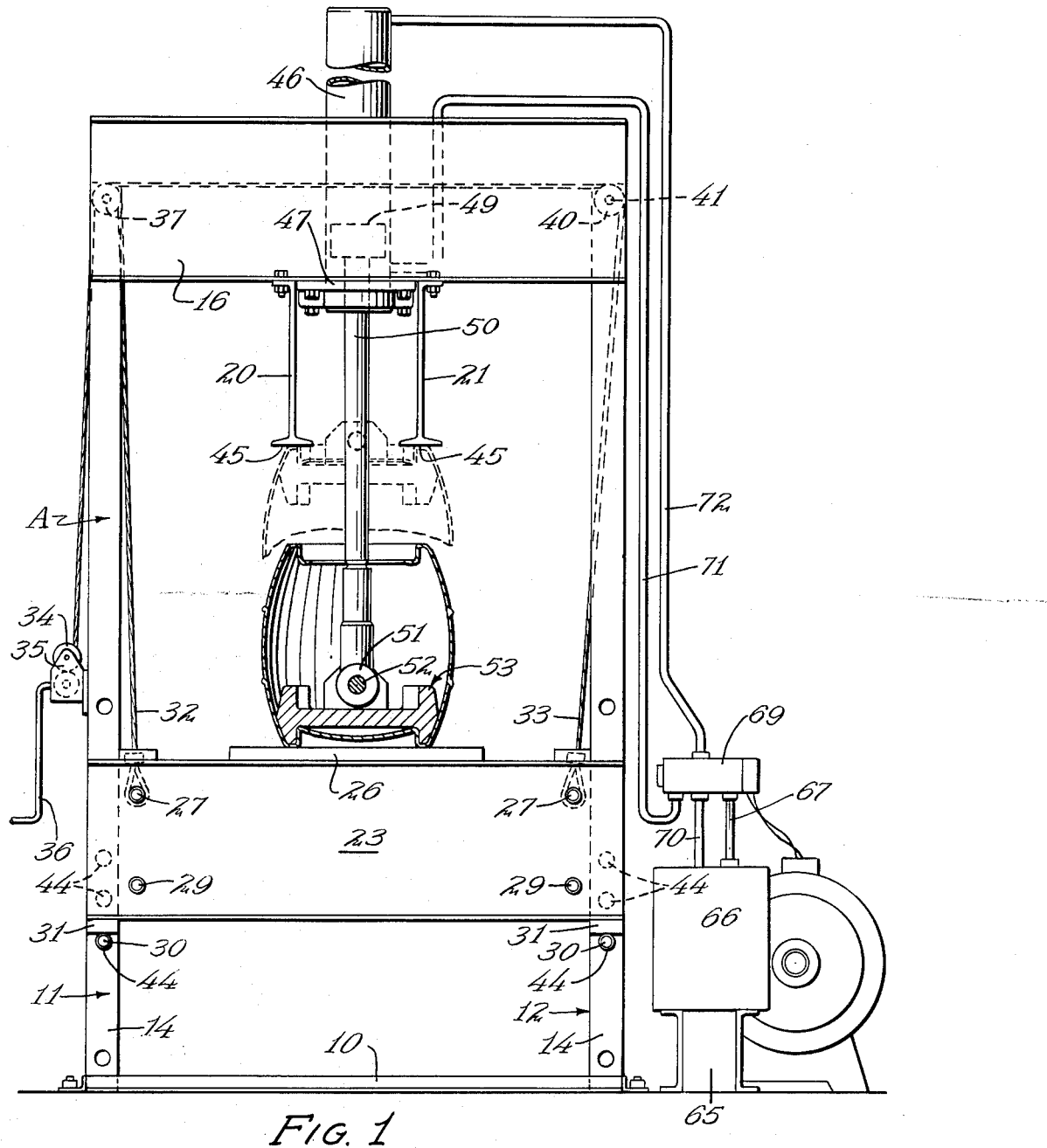
FIGURE 1 is an elevational view of the keg straightening apparatus, a portion of the apparatus being shown in section to indicate the construction thereof.

The keg straightening apparatus is indicated in general by the letter A and is shown as including a base frame 10 which acts to support a pair of end frame members 11 and 12. As indicated in FIGURE 2 of the drawings, each of the end frames 11 and 12 includes a pair of spaced parallel guides 13 and 14 which act as slide guides for a vertically adjustable table. The end members 11 and 12 are connected by a pair of spaced channels 15 and 16 which are positioned at the upper end of the frame members 13 and 14 and which are welded or otherwise secured thereto. The lower flanges 17 and 19 of the channels 15 and 16 are held in proper relation by a pair of parallel eyebeams 20 and 21 which are bolted or otherwise secured to the flanges 17 and 19.

A pair of parallel channels 22 and 23 having opposed outwardly turned upper flanges 24 and outwardly turned lower flanges 25 are held in properly spaced relation by a table 26 mounted upon the upper flanges 24, and by connecting means 27 and 29 which extends through the parallel webs of the flanges. The channels 22 and 23 are spaced apart a distance sufficient to permit the channels and the table 26 to be moved vertically relative to the end frame members 12. Pins 30 may extend transversely of the end members 11 and 12 to hold the table 26 at a desired elevation, the pins 30 bearing against bearing blocks 31 welded or otherwise secured to the lower flanges 25 of the channels 22 and 23. In order to raise or lower the elevation of the table 26, cables 32 and 33 are secured to the connecting ends 27 and are connected at their other ends to the cable drum 34 of a winch 35 mounted upon the end member 11 and manually operable by a crank 36. The cable 32 is trained over a pulley 37 pivotally secured at 39 to the upper end of the upright 14 forming a part of the end member 11. The cable 33 extends over a pulley 40 which is pivotally connected at 41 to the upper end of the upright 13 forming a part of the frame end 12 and extends over a pulley 42 (see FIGURE 2) pivotally connected at 43 to the upper end of the frame member 13 forming a part of the end member 11. By rotation of the crank 36, the channels 23 supporting the table 26 may be raised and lowered, the table being held in any adjusted position by the pins 30 which extend through any of a series of openings 44 extending transversely through the end units 11 and 12.

The under surfaces of the eyebeams 20 and 21 have their opposed flanges 45 on a common plane, and the eyebeams are spaced apart properly so that the flanges 45 engage at least one-third of the circumference of the upper end of the keg when the keg is lifted into engagement therewith. The purpose of this arrangement will be more clearly described.

A hydraulic cylinder 46 terminates in an end plate 47 which is bolted or otherwise secured to the under surface of the flanges 17 and 19 of the channels 15 and 16. A piston 49 is slidable within the cylinder 46 and is attached to a vertical plunger 50 extending through the lower end of the cylinder 46. The lower end of the plunger 50 is equipped with a transverse bearing 51 which is designed to accommodate a pivot pin 52 for connecting the lower end of the plunger to a forming die which is indicated in general by the numeral 53.

The forming die 53 is constructed as is best illustrated in FIGURES 4, 5 and 6 of the drawings. The die includes a horizontal web 54 which supports a pair of spaced upwardly extending ears 55 which are provided with aligned apertures 56 designed to accommodate the pivot pin 52. The web 54 connects a pair of similar arcuate die portions 57 which project an equal distance above and below the web 54. The die portions 57 include a generally cylindrical inner surface 59, and a generally frusto conical outer surface 60 which is of relatively larger diameter at its central point 61 and which tapers to relatively thin upper and lower end portions 62 and 63 respectively. Stated briefly, both the upper and lower portions of the die portions 57 are shaped to fit the contour of the ends of the keg, the lower half of the die being designed to snugly fit the shape of the lower rim of the keg while the upper portion of the die is designed to fit into the upper rim of the keg. As both of the rims are normally identical in shape, the upper and lower portions of the dies 57 are also similarly shaped.

Due to the fact that the male die 53 is pivotally connected to the lower end of the plunger 50, and due to the fact that the die includes two opposed arcuate ends, the die may be inserted into an opening cut into the barrel which is substantially smaller than the length of the die. For example, a 9" diameter disc may be cut from the top of the keg through the use of a suitable hole saw, not specifically shown in the drawings. Due to the fact that the die is tilted into almost parallel relation with the plunger 50 during its insertion into, or removal from, the keg B, the ends of the die will extend across the diameter of the keg and will reshape the dented portions of the barrel ends.

FIGURE 1 of the drawings diagrammatically illustrates a pump 65 designed to obtain fluid from a fluid reservoir 66 connected by a tubular connection 67 to a valve 69. The outlet of the pump 65 is pumped to the valve casing 69 through a conduit 70. The valve 69 controls the flow of fluid from the pump through a conduit 71 leading to the lower end of the cylinder 46, and through a conduit 72 to the upper end of the cylinder 46. The valve 69 acts to selectively direct the fluid under pressure from the pump to the lower end of the cylinder 46 through the conduit 70 while the conduit 72 acts as an exhaust line to return the fluid from the upper end of the cylinder to the reservoir through the valve 69 and the conduit 67. Alternatively, the pumps 65 may pump fluid through the conduit 70 and valve 69 through the connection 72 to the upper end of the cylinder 46, while the lower end of the cylinder is connected by a conduit 71 and valve 69 to the reservoir through the conduit 67.

The problem which is involved with the kegs lies in the fact that the ends of the kegs are often dented, the bung openings are sometimes scarred, leaks sometimes develop, and the pressure opening at the top of the keg becomes faulty. In the operation of the method and apparatus, the kegs are normally reconditioned by first applying water pressure to the keg to test the keg for leaks, and each leak is marked. The next procedure is to cut a circular hole in the top of the keg with a hole saw, the opening being, for example, 9" in diameter. The hole is cut inwardly from the normally dented rim portion.

The barrel is next mounted upon the table 26, and the die 53 on the end of the plunger 50 is tilted as indicated in FIGURE 3 and lowered down into the interior of the keg. After the die 53 is within the keg, the ends of the die are swung down into generally horizontal relation and the plunger is lowered against the bottom of the keg to press out the dents in about one-third of the circumference of the bottom of the keg rim. The plunger is lifted slightly, and the keg is turned through an angle of 120 degrees about its axis. The die is again lowered by the plunger, and the dents in another third of the lower end of the keg rim are straightened. The plunger and die is again lifted and the keg is again rotated in the same direction another 120° and the remaining one-third of the lower keg rim is straightened out.

The plunger 50 is then raised until the die 53 is against the under surface of the top rim of the keg. The keg is lifted by the die into engagement with the flanges 45, thus straightening about one-third of the circumference of the upper end of the keg rim. The ram is lowered slightly, the keg rotated through 120°, and the die lifted to straighten the second one-third of the rim circumference. By repeating this process, the final third of the upper keg rim is straightened.

The plunger is then lowered to lower the keg upon the table 26, and the plunger is then lifted until the die can be tilted into the position shown in FIGURE 3 and removed from the keg.

The discs cut from the top of the keg are then inspected to insure that the pressure opening is properly welded, and additional welding about the pressure opening follows if necessary. The bung opening in the keg is normally inspected and if the bunghole is scarred from plug removal equipment or pitted from chemicals in a cleaning process, the bung opening is rebored to a slightly larger size and a bushing is inserted and welded into place. This bushing or sleeve 80 is tapered and has an internal diameter equal to that of the original bunghole. Before the sleeve is inserted, it is coated with an epoxy resin type adhesive with color matching pigment added. After the adhesive has set, the sleeve is tested with a puller type of mechanical device to a predetermined pressure factor.

Figure 7:
FIGURE 7 is a sectional view through a female die which may be used in construction with the apparatus if it is desired.

The female die 81 shown in FIGURE 7 is used only where the keg is outwardly bulged. The die has a rim or groove 82 designed to fit the contour of the outer surface of the keg, and is used in conjunction with the die 53.

The disc which has been removed is then held in place by a welding fixture and rewelded. The keg is then tested and cleaned and is in readiness for further use.

The operation of sawing a disc from the top of the keg, straightening the ends of the keg, and replacing the disc in the keg end may be accomplished in substantially less than 15 minutes. If additional repair is required, some additional time might be required to repair the keg, depending upon what repairs are necessary. In any event, the kegs may be completely overhauled and returned to service for a cost which is substantially less than the cost of a new keg, and substantially less than the cost of repairing the keg by any other method with which we are familiar.

In accordance with the patent statutes, we have described the principles of construction and operation of our improvement in method and apparatus for repairing metal kegs, and while we have endeavored to set forth the best embodiment thereof, we desire to have it understood that changes may be made within the scope of the following claims without departing from the spirit of our invention.

We claim:

1. An apparatus for restoring keg ends to proper shape, the keg ends having peripheral rims of channel shaped section, the apparatus including a reciprocable plunger, an elongated die hingedly secured to the end of the plunger on a pivot axis extending transversely of the plunger axis and transversely of the die, said die being pivoted from a plane normal to the plunger axis to a plane at an acute angle to the plunger axis, said die including an intermediate web and arcuate ends of proper cross sectional shape to fit into the keg rim projecting from a surface of said web, said die being of a width substantially narrower than the inner diameter of the keg rim, said arcuate ends extending from both surfaces of the web, a table supported normal to the axis of said plunger against which the keg may be forced, and abutments on opposite sides of said plunger against which the other end of the keg may be forced.

2. An apparatus for repairing kegs having a dented end rim, the apparatus including a pair of spaced upright supports, a cross member connecting said supports, a horizontal table between the lower ends of said supports, a vertical cylinder supported by said cross member between said supports, a plunger supported for vertical reciprocation by said cylinder and extending downwardly therefrom, a die pivotally supported on the lower end of said plunger on a transverse pivot, said die including an intermediate web and arcuate projecting ends on opposite sides of said web and on opposite ends thereof, said ends being shaped to fit the contour of the keg end rims, said die being narrower than the inner diameter of the keg rim, and abutment means depending from said cross member on opposite sides of said plunger against which the upper end of the keg may be drawn by said plunger.

3. An apparatus for restoring keg ends to proper shape, the keg ends having peripheral rims of channel shaped section, the apparatus including:
(a) a reciprocable plunger,
(b) an elongated die hingedly secured to the end of the plunger on a pivot axis extending transversely of the plunger axis and transversely of the die,
(c) said die being pivoted generally normal to the plunger axis to a plane substantially perpendicular to the plunger axis,
(d) said die including an intermediate web and arcuate ends of proper cross sectional shape to fit into the keg rim on opposite sides of said web,
(e) said intermediate web being of a lesser depth than said ends,
(f) said die being of a width substantially narrower than the inner diameter of the keg rim,
(g) abutment means in generally vertically spaced relatively opposed relation to said die projecting ends,
(h) said abutment means adapted to be in abutting relation to the end rim of a keg,
(i) said die movable toward and away from said abutment means,
(j) whereby when said die extends diametrically across a keg end, movement of said die ends toward said abutment means repairingly clamps said end rim of a keg against said abutment means.

4. The structure of claim 3 and in which said abutment means are in superposed relation to the arcuate die ends when said die extends diametrically across a keg at the end thereof.

5. The structure of claim 3 and in which the generally normal position of said die is at an acute angle to the plunger axis.

References Cited by the Examiner

UNITED STATES PATENTS

| | | | |
|---|---|---|---|
| 736,647 | 8/03 | Staiger | 153—81 |
| 1,033,687 | 7/12 | Fish. | |
| 2,170,461 | 8/39 | Pepperdine | 29—261 |
| 2,612,204 | 9/52 | Rickhoff et al. | 153—32 |
| 2,625,195 | 1/53 | Tremblay | 153—32 |
| 2,943,386 | 7/60 | Katz | 29—401 |
| 2,946,118 | 7/60 | Stock | 29—401 |

FOREIGN PATENTS

| | | |
|---|---|---|
| 475,110 | 11/37 | Great Britain. |

CHARLES W. LANHAM, *Primary Examiner.*

WHITMORE A. WILTZ, WILLIAM J. STEPHENSON,
*Examiners.*